Feb. 13, 1940.  A. CARRILLO  2,190,255
DELIVERY VALVE
Filed June 23, 1939

Inventor
Aniceto Carrillo
By *signature*
Atty.

Patented Feb. 13, 1940

2,190,255

UNITED STATES PATENT OFFICE 2,190,255

DELIVERY VALVE

Aniceto Carrillo, Mexico, D. F., Mexico

Application June 23, 1939, Serial No. 280,887
In Mexico January 7, 1939

2 Claims. (Cl. 251—10)

This invention relates to improvements in valves.

The prime object of the invention is to provide a valve structure, wherein the valve per se is provided with an extension to normally support a pivoted curved over hinging cover plate, the parts being so arranged that when the valve is manually opened the pressure of the discharging water on the cover plate causes the latter to follow with and cover the valve to permit free egress of water to the outlet opening.

A further object of the invention is to provide a valve structure wherein the valve is manually opened for the discharge of fluid and is automatically closed after discharge of the fluid.

Figure 1:
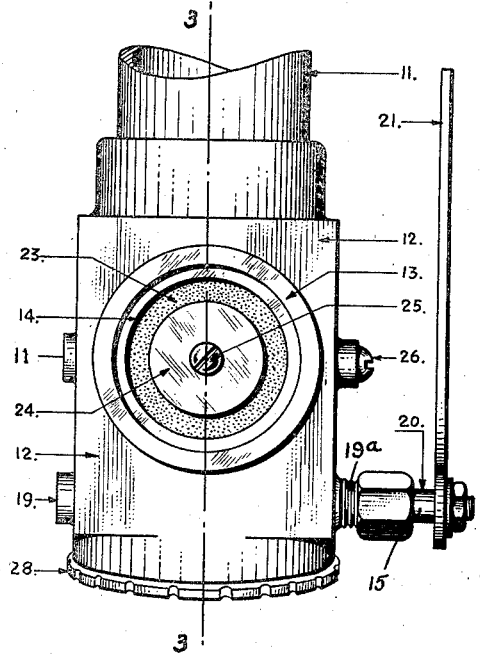
Fig. 1 is a front elevation of the valve.
Figure 2:
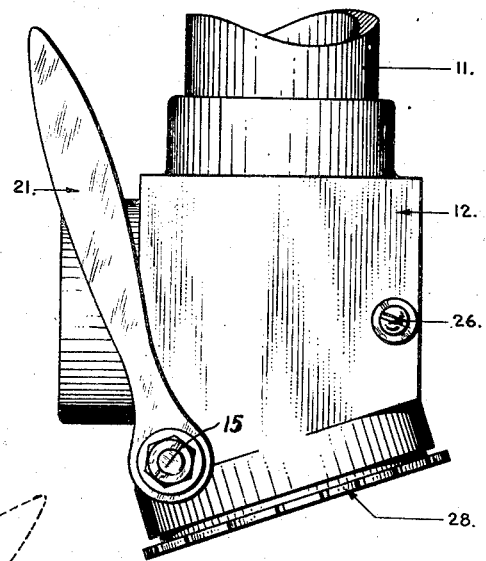
Fig. 2 is a side elevation of the valve.
Figure 3:
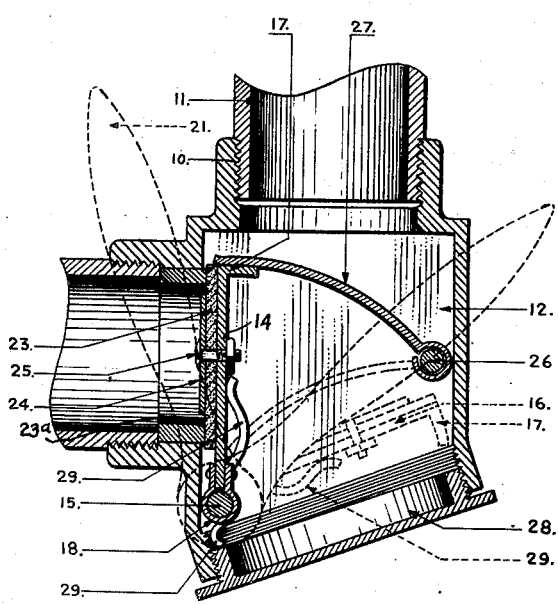
Fig. 3 is a section on the line 3—3 of Fig. 1, showing the parts in closed position in full lines and in open position in dotted lines.

Numeral 12 indicates a casing provided with an inlet opening 10 and outlet opening 13, and is closed at the bottom by a threaded plug 28.

14 indicates a valve having a clip 18 at its bottom to embrace a shaft 15 mounted in bearings 19 and 19a in the casing. The shaft 15 is extended beyond the bearing 19a, as at 20, and attached thereto is an operating handle 21.

The upper end of the valve is formed with an extension 17, and secured to the front of the valve by a bolt 25 and washer 24 is a fiber, rubber or like disk 23 to cooperate with the valve seat 23a around the outlet opening 13.

A spring 29 is coiled around shaft 15, one end of which bears against the inside of the valve, while the opposite end is confined at the bottom of the casing by the plug 28, the tension of the spring being such as to normally close the valve against its seat 23a.

Pivotally mounted on a shaft 26 mounted in the casing 12 in rear of and spaced from the valve and below and spaced from the inlet opening 10 is a curved cover plate 27. The forward end of this cover plate is supported on the extension 17 of valve 14 when the latter is in normal or closed position.

In operation, water from a tank or other source flows through pipe 11 and into the casing 12. When it is desired to release the water the valve 14 is manually opened by manipulation of the handle 21. As the valve is turned on its shaft, the extension 17 follows the contour of the cover plate 27, the latter being held in contact with the extension in the opening operation by the pressure of the water flowing from the inlet pipe 11. When the valve is in wide open position the cover plate, due to the pressure of the water overlies and holds the valve in this position until the water in the casing runs off through the outlet opening.

When the water has run off, the spring 29 automatically returns the valve to normal position. Obviously, as the valve closes it correspondingly raises the cover plate to its normal position.

Having thus described the invention, what I consider as new and desire to secure by Letters Patent is:

1. A valve structure comprising a casing having an inlet and an outlet opening, a valve pivoted in the casing normally closing the outlet opening, the valve having an extension at its outer end, a curved cover plate pivoted in the casing and extending toward the valve and located below and spaced from the inlet opening, the free end of the cover plate being supported when the valve is closed on the extension of the valve, and a handle for manually operating the valve, the extension on the end of the valve following the contour of the curved cover plate when opening said valve, said cover plate overlying said valve when the latter is in wide open position, the pressure of the discharging fluid on the cover plate rocking the latter on its pivot when said valve opens.

2. A valve structure comprising a casing having an inlet and an outlet opening, a valve pivoted in the casing normally closing the outlet opening, the valve having an extension at its outer end, a curved cover plate pivoted in the casing and extending toward the valve and located below and spaced from the inlet opening, the free end of the cover plate being supported when the valve is closed on the extension of the valve, and a handle for manually operating the valve in one direction, the extension on the end of the valve following the contour of the curved cover plate when opening said valve, said cover plate overlying said valve when the latter is in wide open position, the pressure of the discharging fluid on the cover plate rocking the latter on its pivot when said valve opens, and a spring engaging the valve to return it to normal position and through return movement of the valve simultaneously elevate the cover plate to its normal position.

ANICETO CARRILLO.